US006582039B2

(12) United States Patent

Johnson et al.

(10) Patent No.: US 6,582,039 B2

(45) Date of Patent: Jun. 24, 2003

(54) COMBINATION COLOR INKJET AND LASER IMAGE-PRINTING DEVICE WITH DUAL PAPER-PICKING MECHANISM AND METHOD OF IMPLEMENTING SAME

(75) Inventors: Bruce L. Johnson, Eagle, ID (US); Leonard T. Schroath, Boise, ID (US); Bradley J. Anderson, Boise, ID (US)

(73) Assignee: Hewlett-Packard Developement Company, L.P., Houston, TX (US)

( * ) Notice: Subject to any disclaimer, the term of this patent is extended or adjusted under 35 U.S.C. 154(b) by 0 days.

(21) Appl. No.: 09/912,851

(22) Filed: Jul. 24, 2001

(65) Prior Publication Data

US 2003/0021606 A1 Jan. 30, 2003

(51) Int. Cl.[7] .......................... H04N 1/034; B65H 5/00; B41J 2/01; G03G 15/00

(52) U.S. Cl. .......................... 347/3; 271/264; 347/104; 399/2; 399/388; 399/393

(58) Field of Search ................................ 399/1, 2, 361, 399/381, 388, 393, 401, 405; 347/3, 16, 104, 153; 271/109, 114, 264

(56) References Cited

U.S. PATENT DOCUMENTS 5,221,951 A * 6/1993 Sakamoto ................... 399/393
5,570,451 A * 10/1996 Sakaizawa et al. ............ 399/2
5,729,785 A * 3/1998 Sakaizawa et al. ............ 399/2
5,790,915 A * 8/1998 Arcaro et al. .................. 399/2

* cited by examiner

*Primary Examiner*—Sandra Brase

(74) *Attorney, Agent, or Firm*—Steven L. Nichols

(57) ABSTRACT

An image-printing device includes a dual paper-picking device that has two independent means of pulling sheets of paper or other print medium from a supply and feeding the same to the image-printing device. With two paper-picking means operating independently, two different paper transport paths can be operated. One path includes a laser print engine and prints monochromatic pages. The other path includes an inkjet print engine and prints color pages. The image-printing device firmware determines whether each page is a color or monochromatic page and formats the page accordingly for the appropriate print path.

17 Claims, 7 Drawing Sheets

COMBINATION COLOR INKJET AND LASER IMAGE-PRINTING DEVICE WITH DUAL PAPER-PICKING MECHANISM AND METHOD OF IMPLEMENTING SAME

FIELD OF THE INVENTION

The present invention relates to the field of image-printing devices that use paper or a similar print media to print a hardcopy from electronic data. More particularly, the present invention relates to a dual image-printing device that includes both a color inkjet print engine and a laser print engine with a dual paper-picking device that allows the selective delivery of print media from a paper or other print media supply to the two print engines.

BACKGROUND OF THE INVENTION

Modern computers allow users to generate virtually any kind of document the user may desire. For example, word processing software allows a user to generate and easily edit text for documents. Spreadsheet, graphic design, desktop publishing or imaging software packages allow a user to generate or manipulate graphs, pictures, images, graphics, etc. The features and abilities of computer software continually evolve to provide the computer user with the ability to manage or generate data, text and images.

Though society is moving ahead into the digital age, for many applications it is still necessary or desirable to print a hardcopy of the documents generated on a computer. Consequently, printers have evolved along with computers to output high quality renderings on paper or other print media of the documents a user has generated on a computer.

In addition to printers, photocopiers allow users to quickly reproduce a document of which multiple copies are needed. Fax machines allow users to almost instantly transmit hardcopy documents over unlimited distances. Multi-Function Peripherals ("MFPs") are devices that combine such functions as printing, copying, faxing and scanning.

As used herein, the term "image-printing device" broadly denotes any device which outputs a hardcopy document on paper or some other print medium. For example, "image-printing device" includes, but is not limited to, printers, photocopiers, fax machines, plotters, digital copiers and MFPs. The term "printer" refers broadly to any device that receives electronic data from a computer and outputs a hardcopy document corresponding to that data. Thus, "printer" refers, but is not limited to, electrostatic or laser printers, inkjet printers, thermal transfer printers, dot-matrix printers, plotters, etc.

All image-printing devices are fed a supply of a print medium, typically paper, on which the hardcopy document being output is rendered. While paper is the most widely used print medium, modem image-printing devices can utilize a wide variety of print media including, but not limited to, paper, cardstock, transparencies, labels, vinyl, etc. As used hereafter, the term "paper" shall be understood to refer principally to paper, but it will also be understood that wherever an image-printing device is described as using paper as the print medium, any other print medium could also be used, consistent with any constraints imposed by the particular image-printing device in question.

For most image-printing devices, regardless of the type of device, the modern trend is to adapt the image-printing device to accept and use a standard size of paper, for example, 8.5 inch by 11 inch paper or A4 paper. With all image-printing devices in an office using the same type of paper, the task of supplying the devices with paper is greatly simplified.

In most cases, the output speed and reliability of an image-printing device is heavily dependent on the ability of the device to feed itself the paper or other print medium used. For example, a printer cannot output printed pages any faster than it can pull in and position the paper to be printed on. Similarly, if the paper is mishandled, the printer will jam and stop, thereby causing further delays in the printing process. Consequently, the system for feeding paper or other print medium into an image-printing device is very important and critical to the speed and reliability of the device.

Unfortunately, a trade off must usually be made between the speed and the reliability of the paper feeding system. The faster the paper is handled, the more likely is a misfeed and a consequent paper jam. If the paper is handled more slowly, a misfeed become less likely, but the output of the printing device is correspondingly reduced.

Equally important in an image-printing device is the ability to produce color or monochromatic documents. However, again, a trade off is typically encountered. Laser or electrostatic printers provide excellent resolution in a printed document, particularly with text. However, laser printers are not well adapted to color printing. Rather, laser printers that attempt to print in color typically require four passes of the print engine over the print medium to print each of the four constituent colors: cyan, magenta, yellow and black (CMYK). Additionally, laser print engines that attempt to print in color are also relatively large, slow and expensive.

In contrast, inkjet printers are well adapted to printing documents in color. However, the inkjet printer cannot entirely match the resolution and speed of the laser printer.

Consequently, there is a need in the art for an image-printing device that combines the advantages of a laser printer for monochromatic printing with the advantages of an inkjet printer for color printing. Additionally, there is a need in the art for an underlying paper feeding system that can support such a combination printing device.

SUMMARY OF THE INVENTION

The present invention is directed to an image-printing device that combines a laser printer for monochromatic printing with an inkjet printer for color printing. In this way, the best print engine can be used during the print job depending on whether a page is best printed monochromatically or in color.

The image-printing device of the present invention also preferably includes a dual paper-picking device with first and second paper-picking mechanisms. The first paper-picking mechanism feeds print media from a supply of a print medium to a first transport path that includes the laser print engine. The second paper-picking mechanism feeds print media from a supply of a print medium to a second transport path that includes the inkjet print engine. The first and second paper-picking mechanisms each preferably include a driven roller that is selectively brought into contact with the supply of print medium. The image-printing device of the present invention may also include a tray for holding the supply of a print medium, where both paper-picking mechanisms feed print media from the supply of print medium in the tray.

The image-printing device of the present invention preferably includes firmware for controlling operation of the image-printing device. The firmware receives the data of a print job, determines for each page of the print job whether that page should be printed monochromatically or in color, sends print data for that page to the laser print engine or the inkjet print engine depending on the determination of whether that page should be printed monochromatically or in color, and controls the dual paper-picking device to feed print media to that print engine receiving the print data for that page.

The image printing device of the present invention also preferably includes an output tray in which sheets of a print job printed by both the laser print engine and the inkjet print engine are interleaved. Thus, the completed print job is automatically collated for the user.

The present invention also encompasses the methods of making and using the image-printing device described above. For example, the present invention encompasses a method of printing a print job with an image-printing device that has both a laser print engine for monochromatic printing and an inkjet print engine for color printing. The method is performed by receiving the data of a print job in the image-printing device, determining for each page of the print job whether that page should be printed monochromatically or in color, and printing that page with the laser print engine or the inkjet print engine depending on the determination of whether that page should be printed monochromatically or in color.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Throughout the drawings, identical elements are designated by identical reference numbers.

DETAILED DESCRIPTION OF THE PREFERRED EMBODIMENTS

In the preferred embodiment, the present invention is an image-printing device that includes a dual paper-picking device that has two independent means of pulling sheets of paper or other print medium from a supply and feeding the same to the print engines of the image-printing device. With two paper-picking means operating independently, two different paper transport paths can be maintained. One path includes a laser print engine and prints monochromatic pages. The other path includes a color inkjet print engine and prints color pages. The image-printing device firmware determines whether each page is best rendered as a color or monochromatic page and formats the page accordingly for the appropriate print path.

The dual paper-picking device disclosed herein is also separately disclosed and claimed in a related application that is being filed concurrently. This related application is assigned in common with the present application to Hewlett-Packard Company and is entitled "Dual Paper Picking Mechanism and Method for Increasing Speed and Reliability of Paper Path Delivery." The attorney reference number for the related application is 10010818-1. The application Ser. No. is 09/912,853. This related application is incorporated herein by reference in its entirety.

Figure 1:
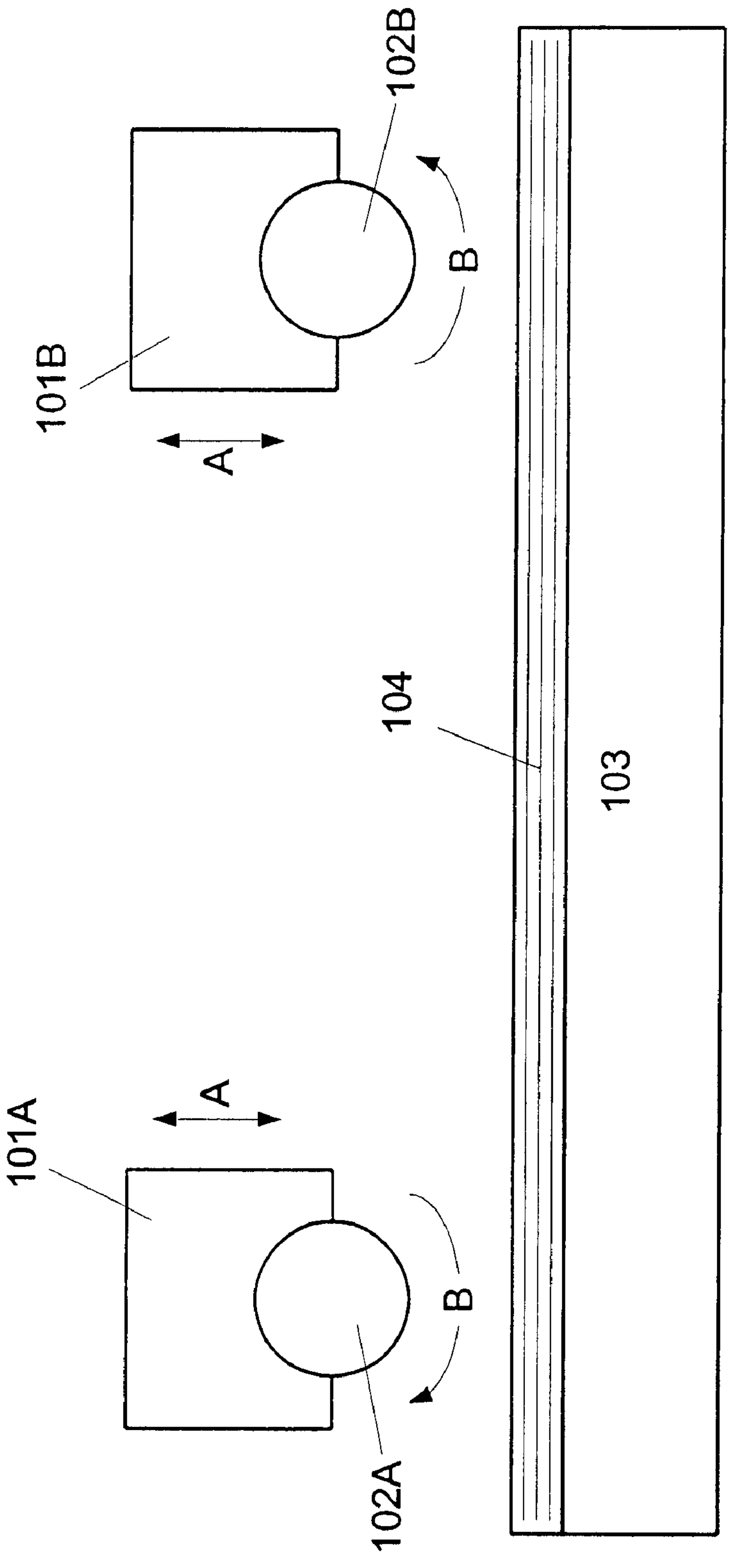
FIG. 1 is an illustration of a dual paper-picking device utilized by an image-printing device according to one embodiment of the present invention.

Using the drawings, the preferred embodiments of the present invention will now be explained. FIG. 1 illustrates a preferred embodiment of a paper-picking mechanism that is preferably utilized by the combination image-printing device of the present invention.

As shown in FIG. 1, the paper-picking mechanism preferably includes two rollers (102A, 102B). Each roller (102) is preferably a disk or wheel, made of a high-friction material, such as rubber. However, other paper-picking mechanisms would be within the scope of the present invention.

In principle, a roller (e.g., 102) functions as a paper-picking device in the following manner. When a sheet of paper or other print medium is to be pulled from a supply of print medium, the roller is driven to rotate about a central axis, the roller is then brought into contact with the next sheet of paper or other print medium in the supply. As the roller rotates, the roller does not slide over the surface of the paper, but rather the sheet of paper is driven into a paper transport path of the image-printing device.

Consistent with this explanation, each of the rollers (102A, 102B) illustrated in FIG. 1 is rotatably mounted on a driver (101A, 101B). The drivers (101) rotate the rollers (102) as needed. Each driver (101) also independently moves up and down as illustrated by the arrows (A) in FIG. 1. This motion brings the driven rollers (102) into and out of contact with a supply of paper (104) or other print medium. The paper (104) or other print medium is typically stored in a supply tray (103), but may simply be placed in a print medium bay.

As shown in FIG. 1, the rollers (102) are preferably driven in opposite directions. The roller on the left (102A) is driven clockwise as indicated by the arrow (B). The roller on the right (102B) is driven counter-clockwise as indicated by the second arrow (B). Consequently, each roller (102) pushes the sheet of paper it may be in contact with in a different direction. The roller on the left (102A) will move sheets of paper (104) out of the tray (103) to the left. The roller on the right (102B) will move sheets of paper (104) out of the tray (103) to the right.

Figure 2:
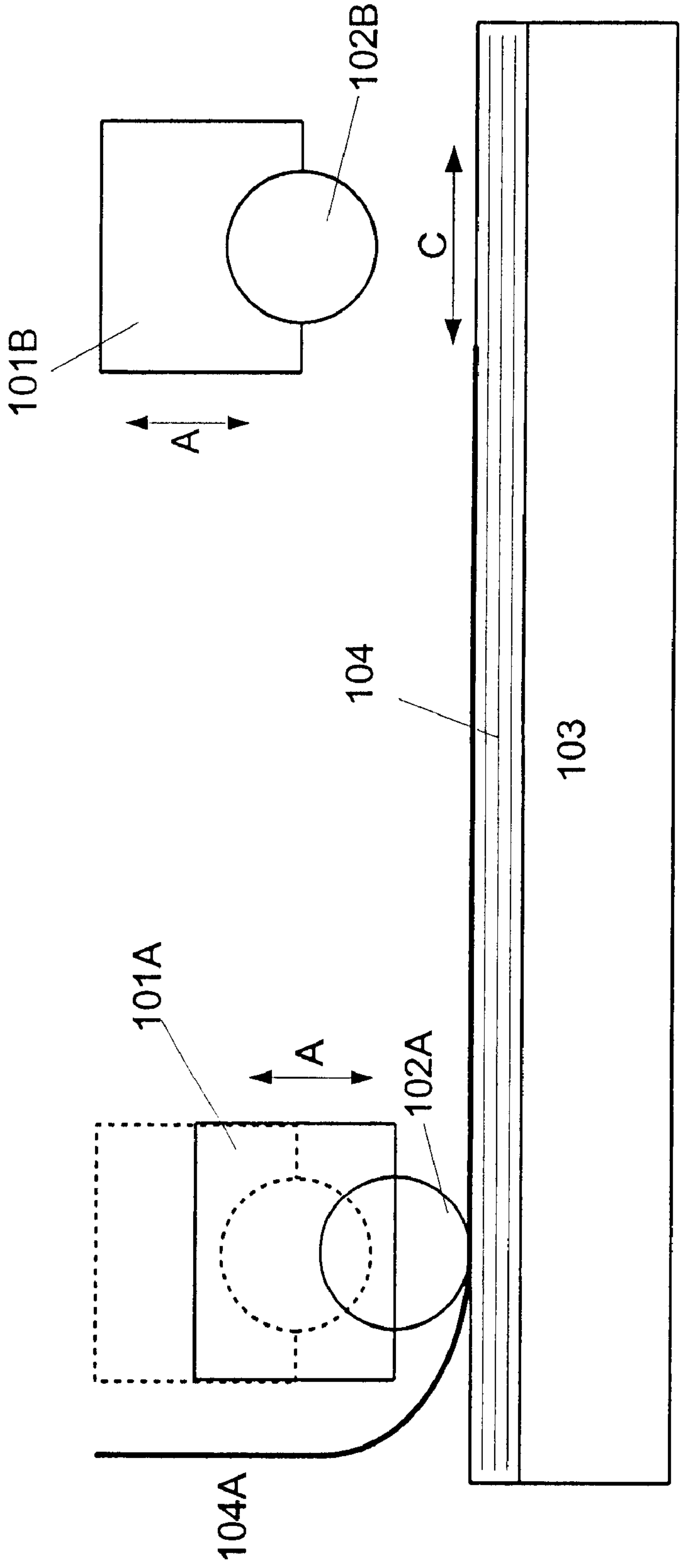
FIG. 2 is an illustration of the dual paper-picking device of FIG. 1 in a first stage of operation.

Beginning with FIG. 2, an example of an operating method of the dual paper-picking mechanism of FIG. 1 will be explained. As shown in FIG. 2, one of the rollers (102), in this example, the roller to the left (102A), is driven and lowered or otherwise brought into contact with the paper supply (104). The top sheet of paper or other print medium in the supply (104), in this case sheet (104A), is then pushed by the rotating roller (102A) out of the supply tray (103) and into a paper transport path as shown in FIG. 2. In this way, roller (102A) picks sheets from the supply (104) and feeds the paper transport path of the image-printing device.

Initially, before it is moved by the roller (102A), the right end of the top sheet (104A) extends under the second roller (102B). At this point in the cycle, the second roller (102B), illustrated to the right of FIG. 2, is raised and not in contact with the paper supply (104). However, as soon as the top sheet (104A) has been moved by the left roller (102A) so that the top sheet (104A) no longer extends into the space (C) under the right roller (102B), the right roller (102B) can be lowered to contact and begin moving the next sheet down in the stack (104). Consequently, sheets can be removed from the stack (104) more quickly because the second roller (102B) need not wait until the first roller (102A) has completely removed the top sheet (104A) from the stack (104) before contacting and beginning to move the next sheet down in the stack (104) and vice versa.

Figure 3:
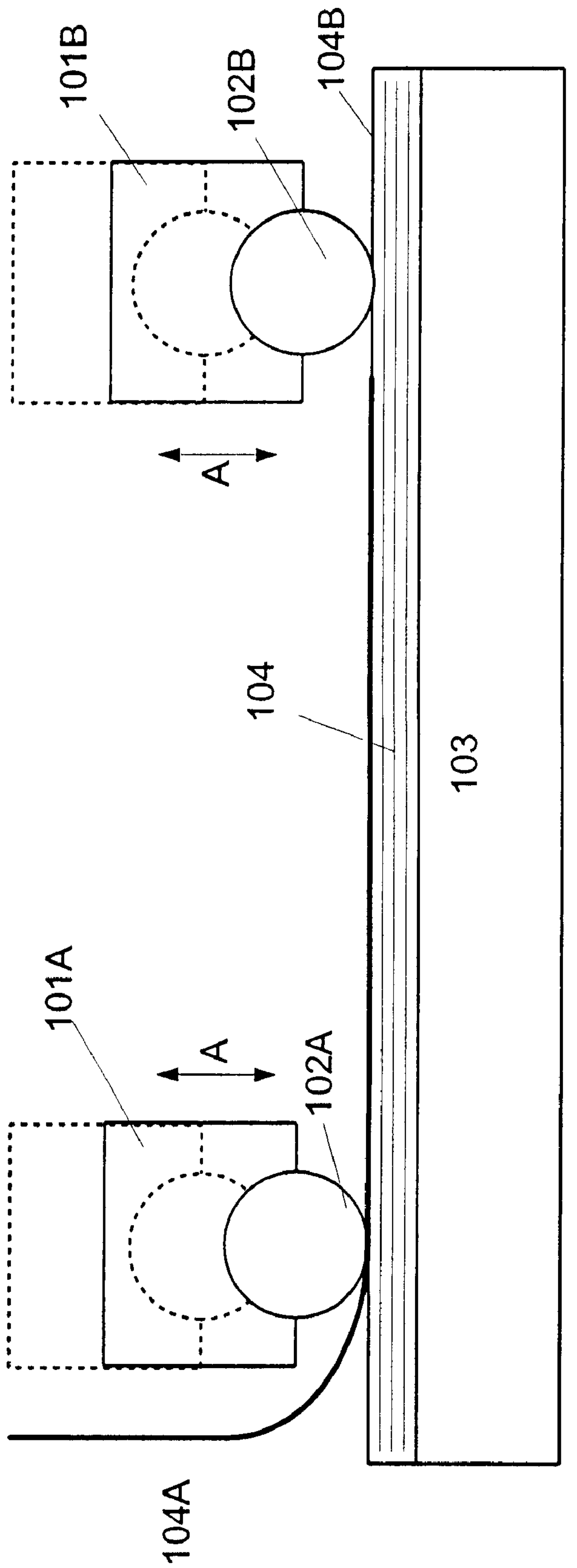
FIG. 3 is an illustration of the dual paper-picking device of FIG. 1 in a second stage of operation.

FIG. 3 continues the illustration of an exemplary method of operating the dual paper-picking mechanism of FIG. 1. As shown in FIG. 3, and as described above, when the top sheet (104A) of paper or other print medium has been moved by the first or left roller (102A) out from under the second or right roller (102B), the second roller (102B) is lowered or otherwise brought into contact with the stack or supply of paper (104) or other print medium and can begin then to feed the next sheet (104B) in the stack (104) into a paper transport path of the image-printing device.

As noted above, there is often a trade off in the mechanism that feeds paper or another print medium to an image-printing device. If the mechanism attempts to move and feed the paper too quickly, the probability that the paper will be mishandled and jam the image-printing device is correspondingly increased. Alternatively, if the paper or other print medium is moved and fed more slowly, there is less chance of a misfeed, but the output of the image-printing device is correspondingly reduced.

With the paper-picking mechanism of FIGS. 1–3, this trade off can be avoided. Because the mechanism is a dual paper-picking mechanism, each paper-picking device, e.g., a driven roller, can move or feed sheets at a relatively low speed decreasing the probability of mishandling and a consequent jam. However, because two picking devices are feeding sheets to the image-printing device, the overall output speed of the image-printing device can be increased, perhaps doubled.

With the dual paper-picking mechanism described above, it is possible to reliably feed paper at an increased rate into a single paper transport path. Alternatively, it is possible to have the dual paper-picking mechanism feed two independent paper transport paths. It is the embodiment with two independent paper transport paths that supports the present invention.

Figure 4:
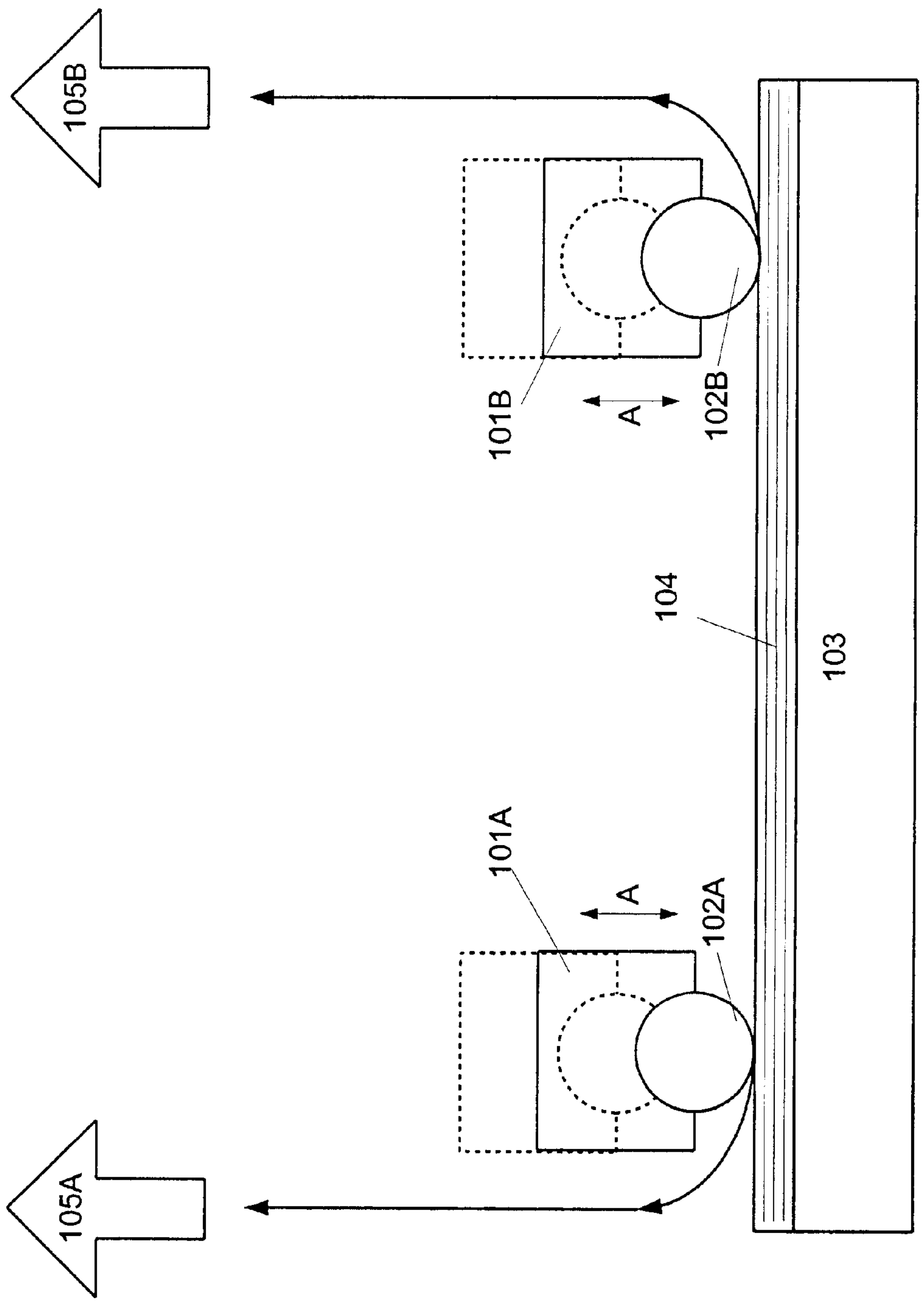
FIG. 4 is an illustration of the dual paper-picking device of FIG. 1 feeding two separate paper paths.

FIG. 4 illustrates an embodiment of the present invention in which two separate paper transport paths are fed by the dual paper-picking mechanism. As shown in FIG. 4, the left roller (102A) feeds a first paper transport path (105A). Preferably, the first paper transport path (105A) is located immediately above the roller (102A) so as to conveniently receive sheets of paper or other print medium from that roller (102A).

The right roller (102B) feeds a second paper transport path (105B). Again, the second paper transport path (105B) is preferably located immediately above or adjacent the right roller (102B) so as to conveniently receive sheets of paper or other print medium from that roller (102B).

Where this is the case, the two separate paper paths (105A, 105B) illustrated in FIG. 4 can be associated with independent print engines to allow for faster output using a parallel printing or copying process. This embodiment of the present invention is illustrated in FIG. 5 and will be explained below.

Figure 5:
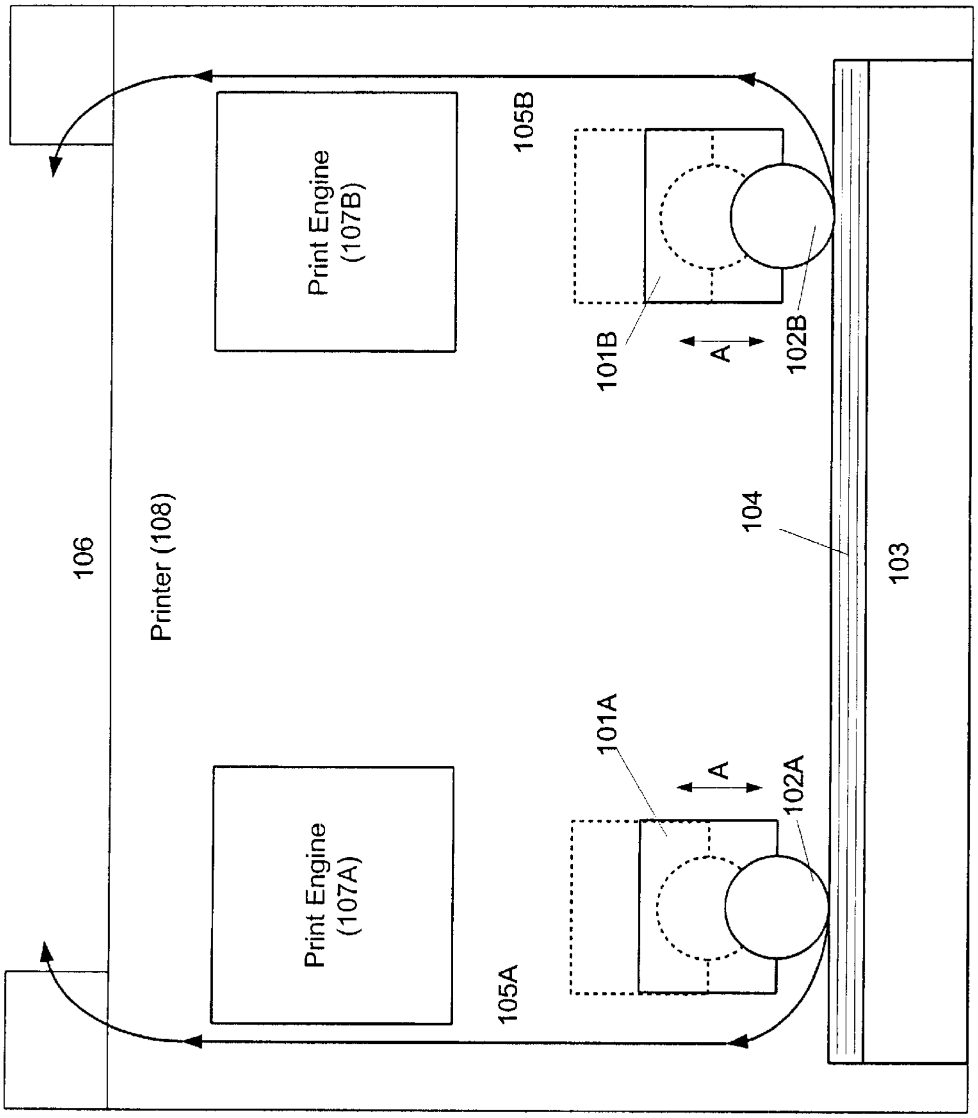
FIG. 5 is an embodiment of an image-printing device according to the present invention in which the dual paper-picking device of FIG. 4 feeds two separate paper paths and enables parallel printing.

FIG. 5 illustrates an image-printing device embodied according to the principles of the present invention. The image-printing device (108) illustrated in FIG. 5 is a printer. However, it will be understood by those skilled in the art that the principles illustrated in FIG. 5 could be readily adapted for use in any other type of image-printing device including a fax machine, photocopier, MFP, etc.

As shown in FIG. 5, the printer (108) may include two independent paper transport paths (105A, 105B) that are each associated with a separate print engine (107A, 107B). In the printer (108) of exemplary FIG. 5, the print engines (107A, 107B) may be electrostatic or laser print engines, inkjet print engines, thermal transfer print engines, dot matrix print engines, etc. In fact, it is not necessary that both print engines (107A, 107B) be of the same type. Rather, the image-printing device (108) may incorporate two different types of print engines on parallel paper transport paths.

With dual print engines (107) being fed by two independent paper transport paths (105A, 105B), the image-printing device (108) can execute a print job using a parallel printing process. For example, a first page of the print job is printed on paper in the left transport path (105A) by the left print engine (107A). The second page is printed on paper in the right transport path (105B) by the right print engine (107B). In this way, the overall speed with which the print job is executed can be dramatically increased.

An output tray or area (106) of the image-printing device (108) can be fed with the output of both print engines (107). Pages from the two print engines (107) are interleaved in the output tray (106) so that the pages are collated into the order specified by the print job.

Given the preceding explanation, the printer of FIG. 5 can be specifically adapted to address the needs existing in the art for a printer the combines the advantages of laser printing for monochromatic printing and inkjet printing for color printing. An image-printing device according to the present invention that provides these advantages is illustrated in FIG. 6.

Figure 6:
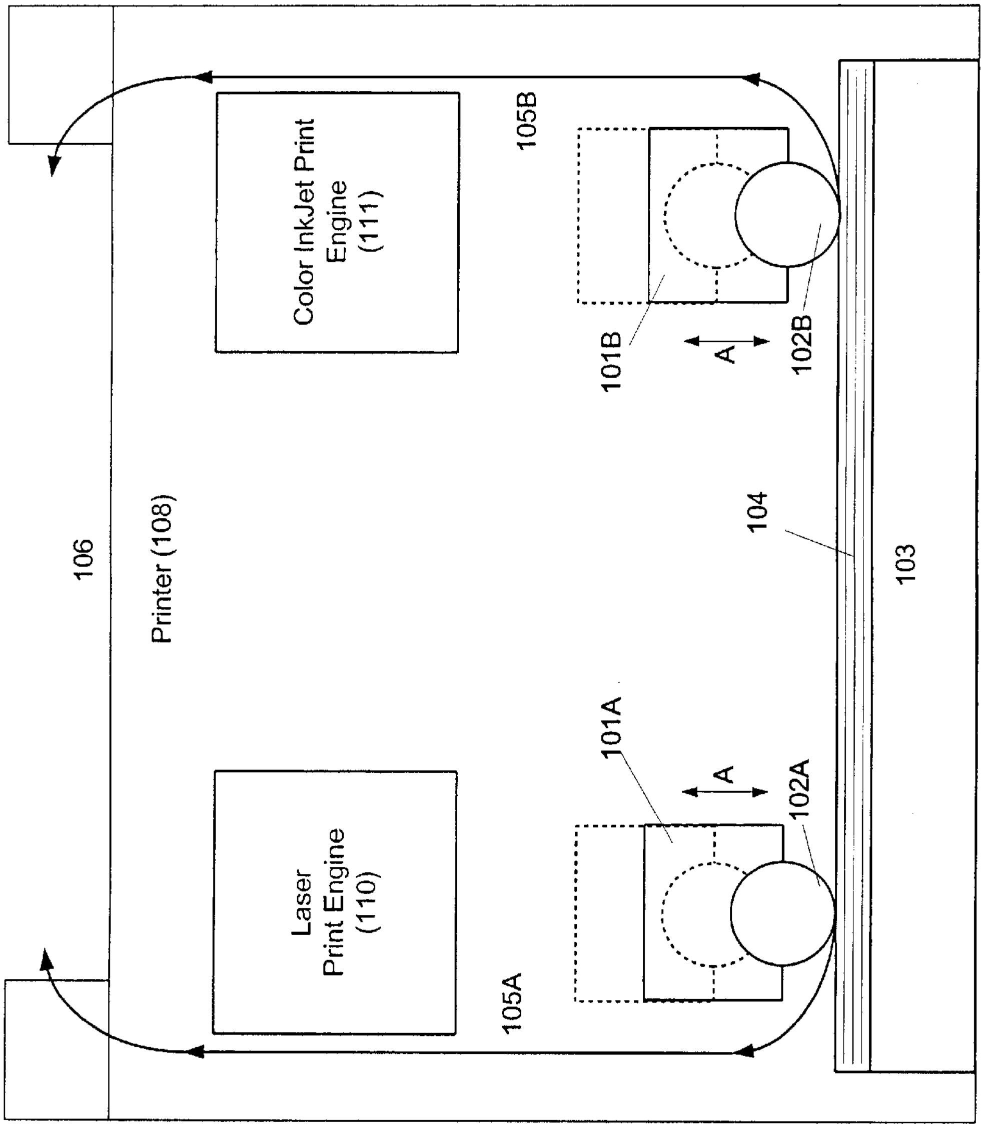
FIG. 6 is an embodiment of an image-printing device according to the present invention in which the dual paper-picking device of FIG. 4 feeds two separate paper paths and enables parallel printing. One path includes a laser print engine, and the other path includes an inkjet print engine.

As shown in FIG. 6, an image-printing device, e.g., a printer (108), that incorporates the dual paper-picking device (101, 102) that feeds two separate paper transport paths (105) can also include a different print engine (110, 111) associated with respective paper transport paths (105). In the example of FIG. 6, according to the present invention, the image-printing device (108) includes a laser print engine (110) which receives paper or other print media through the left transport path (105A). The image-printing device (108) also includes a color inkjet print engine (111) which receives paper or other print media through the right transport path (105B).

As used herein, the term "print engine" refers to the components and circuitry necessary to execute a printing process. Thus, a laser print engine (110) will include, among other things, a laser, laser driver, electrostatic printing drum and the other components necessary to a laser or electrostatic printing process. Similarly, an inkjet print engine (111) will include, among other things, an array of inkjets, circuitry driving the jets, a supply of ink feeding the jets and the other components necessary to an inkjet printing process.

When a print job is submitted to the image-printing device (108) illustrated in FIG. 6, different pages of the print job can be printed by different print processes. For example, if a first page of the print job is entirely or predominantly text, or includes only monochromatic pictures, figures, graphics, etc., the first page of the print job is preferably printed by pulling a sheet of paper or other print medium (104) using the left paper-picking mechanism (102A) and transporting that sheet through the transport path (105A) to the laser print engine (110). The laser print engine (110) then prints the first page of the print job on the passing sheet of paper with all the advantages of speed and resolution that laser printing provides for monochromatic printing.

Assume, for purposes of this example, that the second page of the print job is entirely or predominantly color images, i.e., images for which color data is included in the incoming data stream of the print job. If this is the case, the second page of the print job is preferably printed by pulling a sheet of paper or other print medium (104) using the right paper-picking mechanism (102B) and transporting that sheet through the transport path (105B) to the color inkjet print engine (111). The inkjet print engine (111) then prints the second page of the print job on the passing sheet of paper in color and with all the advantages that inkjet printing provides for color printing.

Figure 7:
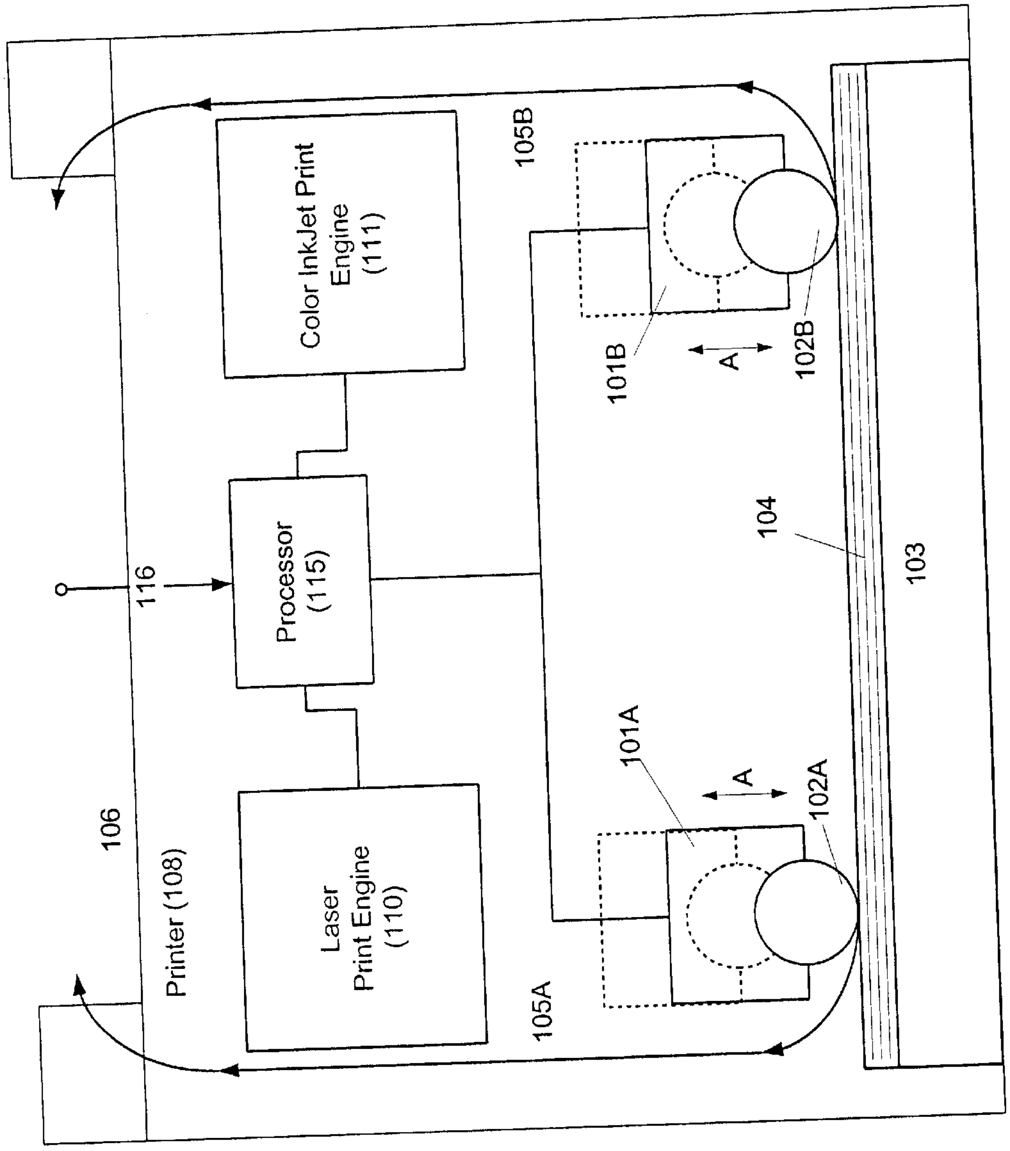
FIG. 7 is a further illustration of the circuitry of the image-printing device of FIG. 6.

This process of the present invention will be described in more detail with regard to FIG. 7. FIG. 7 illustrates in more detail the circuitry of the image-printing device of FIG. 6 that supports the dual printing process described above. As shown in FIG. 7, the image-printing device, e.g., a printer (108), receives a stream of data representing a print job over a connection (116) to a host computer or network.

The image-printing device illustrated can also be some other type. For example, if the image-printing device (108) is a fax machine, the connection (116) would be a phone line over which fax data is received.

As the data of the print job is received in the image-printing device (108), it is processed by the firmware of the device (108). This firmware is represented generically in FIG. 7 as a processor (115).

As shown in FIG. 7, the processor (115) is connected to and controls the two paper-picking devices that feed the separate transport paths (105) and print engines (110, 111). In the example of FIG. 7, the processor (115) controls the drivers (101) for the driven rollers (102) that are the dual paper-picking device.

The processor (115) is also connected to both the laser print engine (110) and the color inkjet print engine (111). Consequently, the processor (115) can selectively feed the data of an incoming print job to either the laser print engine (110) or the inkjet print engine (111).

As the electronic data of the print job is received over the connection (116), the processor (115) will make a page-by-page determination as to whether the page should be printed monochromatically with the laser print engine (110) or in color with the inkjet print engine (111). This may be done based simply on whether a page has any significant element that is to be rendered in color, i.e., has color data provided in the data stream, that would warrant color printing. Other simpler or more sophisticated means of deciding whether a page should be printed in color or monochromatically are within the spirit and scope of the present invention.

If the processor (115) determines that a particular page of the print job is to be rendered monochromatically using the laser print engine (110), the processor (115) will signal the left driver (101A) and roller (102A) to feed a sheet of paper or other print medium (104) into the left transport path (105A). The processor (115) will also transmit the print data for that page to the laser print engine (110). The page is thus printed monochromatically by the laser print engine (110) with all the advantages of monochromatic laser printing.

Alternatively, if the processor (115) determines that a particular page of the print job is to be rendered in color using the inkjet print engine (111), the processor (115) will signal the right driver (101B) and roller (102B) to feed a sheet of paper or other print medium (104) into the right transport path (105B). The processor (115) will also transmit the print data for that page, including the color data, to the inkjet print engine (111). The page is thus printed in color by the inkjet print engine (111) with all the advantages of color inkjet printing.

The pages are then preferably automatically interleaved and collated in the output tray (106) of the image-printing device (108). In this way, those pages that need to be printed in color are so rendered by an inkjet printing process well suited to color printing, while those pages that are simply monochromatic are printed with excellent speed and resolution by a laser or electrostatic printing process well suited to monochromatic printing.

In addition to the advantages already described, the image-printing device of the present invention can also be used to discriminate between types of print media. For example, when printing transparencies, laser or electrostatic print processes produce inferior printed transparencies as compared to the transparencies produced by inkjet printing. Consequently, with the present invention, if transparencies are being printed, the type of media can be detected or indicated to the image-printing device and the device will then print the transparencies exclusively using the inkjet print path so as to produce optimal quality transparencies. Other examples of print media that are bettered suited to a particular printing process are also within the scope of the present invention.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An image-printing device comprising:

a laser print engine for monochromatic printing;

an inkjet print engine for color printing;

a single supply of a print medium; and a dual paper-picking device with first and second paper-picking mechanisms, wherein said first paper-picking mechanism feeds print media from said single supply of a print medium to a first transport path that comprises said laser print engine, and said second paper-picking mechanism feeds print media from said single supply of print medium to a second transport path that comprises said inkjet print medium.

2. The image-printing device of claim 1, wherein said first and second paper-picking mechanisms each comprise a driven roller that is selectively brought into contact with said single supply of print medium.

3. The image-printing device of claim 1, further comprising firmware for controlling operation of said image-printing device, wherein said firmware receives data of a print job, determines for each page of said print job whether that page should be printed monochromatically or in color, sends print data for that page to said laser print engine or said inkjet print engine depending on said determination of whether that page should be printed monochromatically or in color, and controls said dual paper-picking device to feed print media to that print engine receiving the print data for that page.

4. The image-printing device of claim 3, wherein said first and second paper-picking mechanisms each comprise a driven roller that is selectively brought into contact with said supply of print medium.

5. The image printing device of claim 3, wherein said output area further comprises an output tray in which sheets of a print job printed by both said laser print engine and said inkjet print engine are interleaved.

6. The image printing device of claim 1, wherein said output area further comprises an output tray in which sheets of a print job printed by both said laser print engine and said inkjet print engine are interleaved.

7. A method of printing a print job with an image-printing device that comprises a single supply of a print medium, and both a laser print engine for monochromatic printing and an inkjet print engine for color printing, said method comprising:

receiving data of a print job in said image-printing device;

determining for each page of said print job whether that page should be printed monochromatically or in color;

feeding print media from said single supply of a print medium to either a first transport path that comprises said laser print engine or a second transport path that comprises said inkjet print engine, said feeding to be accomplished by a dual paper-picking device with first and second paper-picking mechanisms, said first paper-picking mechanism corresponding to said first transport path, and said second paper-picking mechanism corresponding to said second transport path;

controlling said dual paper-picking device to feed print media selectively to the print engine printing a particular page of said print job depending on said determination of whether that page should be printed to either of said first or second transport paths; and printing that page with said laser print engine or said inkjet print engine depending on said determination of whether that page should he printed monochromatically or in color.

8. The method of claim 7, wherein said step of printing that page further comprises selectively sending print data for that page to said laser print engine or said inkjet print engine depending on said determination of whether that page should be printed monochromatically or in color.

9. The method of claim 7, wherein said first and second paper-picking mechanisms each comprise a driven roller, and said controlling said dual paper picking device further comprises selectively driving a roller of a paper-picking mechanism and selectively bringing that driven roller into contact with said single supply of print medium.

10. The method of claim 7, further comprising interleaving sheets of a print job printed by both said laser print engine and said inkjet print engine in an output tray of said image-printing device.

11. An image-printing device that comprises a single supply of a print medium, and both a laser print engine for monochromatic printing and an inkjet print engine for color printing, said device further comprising:

means for receiving data of a print job in said image-printing device;

means for determining for each page of said print job whether that page should be printed monochromatically or in color;

means for selectively sending print data for a particular page of said print job to either said laser print engine or said inkjet print engine from said single supply of a print medium depending on said determination of whether that page should be printed monochromatically or in color; and means for printing that page with said laser print engine or said inkjet print engine depending on said determination of whether that page should be printed monochromatically or in color.

12. The device of claim 11, further comprising:

a dual paper-picking device with first and second paper-picking mechanisms, said first paper-picking mechanism feeding print media from said single supply of a print medium to a first transport path that comprises said laser print engine and said second paper-picking mechanism feeding print media from said single supply of a print medium to a second transport path that comprises said inkjet print engine; and means for controlling said dual paper-picking device to feed print media selectively to the print engine printing a particular page of said print job depending on said determination of whether that page should be printed monochromatically or in color.

13. The device of claim 11, further comprising means for interleaving sheets of a print job printed by both said laser print engine and said inkjet print engine in an output tray of said image-printing device.

14. An apparatus for delivering print media to a printing device comprising:

a first print media picking mechanism which feeds print media from a single supply of print medium to a first transport path; and a second print media picking mechanism which feeds print media from said supply of print medium to a second transport path;

wherein said first transport path comprises a laser print engine; and.

wherein said second transport path comprises an inkjet print engine.

15. An apparatus according to claim 14, wherein said single supply of print medium comprises a tray for supporting print media.

16. An apparatus according to claim 15, wherein said first and second print media picking mechanisms each comprise a driven roller that is selectively brought into contact with said single supply of print medium.

17. An apparatus according to claim 14, further comprising firmware for controlling said print media delivering apparatus, wherein said firmware:

receives data of a print job;

determines for each page of said print job whether that page should be printed monochromatically or in color, sends print data for that page to said laser print engine or said inkjet print engine depending on said determination of whether that page should be printed monochromatically or in color, and controls said print media delivering apparatus to feed print media to that print engine receiving the print data for that page.

* * * * *